(12) United States Patent
Degenstein et al.

(10) Patent No.: US 7,927,572 B2
(45) Date of Patent: Apr. 19, 2011

(54) PURIFYING CARBON DIOXIDE AND PRODUCING ACID

(75) Inventors: Nick Joseph Degenstein, East Amherst, NY (US); Minish Mahendra Shah, East Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 12/564,206

(22) Filed: Sep. 22, 2009

(65) Prior Publication Data

US 2010/0080747 A1 Apr. 1, 2010

Related U.S. Application Data

(60) Provisional application No. 61/100,399, filed on Sep. 26, 2008, provisional application No. 61/100,411, filed on Sep. 26, 2008.

(51) Int. Cl.
*B01J 10/00* (2006.01)
*C01B 31/20* (2006.01)
*C01B 21/38* (2006.01)

(52) U.S. Cl. .................. 423/437.1; 423/235; 423/242.1; 423/393; 423/522; 423/523; 422/168; 422/169; 422/170; 422/187; 422/188; 422/189

(58) Field of Classification Search ............... 423/437.1, 423/235, 242.1, 393, 522, 523; 422/168, 422/169, 170, 187, 188, 189
See application file for complete search history.

(56) References Cited

U.S. PATENT DOCUMENTS

| | | | |
|---|---|---|---|
| 2,184,707 A | 12/1939 | Berl | |
| 2,247,625 A | 7/1941 | Willenborg | |
| 3,511,027 A | 5/1970 | Roberts et al. | |
| 3,531,664 A | 9/1970 | Hals | |
| 3,649,188 A | 3/1972 | Keilin et al. | |
| 4,148,868 A | 4/1979 | Fattinger | |
| 5,321,946 A | 6/1994 | Abdelmalek | |
| 5,590,519 A | 1/1997 | Almlof et al. | |
| 5,648,053 A * | 7/1997 | Mimura et al. | 423/210 |
| 6,497,852 B2 * | 12/2002 | Chakravarti et al. | 423/228 |
| 6,898,936 B1 | 5/2005 | Ochs et al. | |
| 7,416,716 B2 | 8/2008 | Allam et al. | |

FOREIGN PATENT DOCUMENTS

| | | |
|---|---|---|
| DE | 2654582 A1 | 6/1979 |
| EP | 1 050 509 A1 | 11/2000 |
| EP | 1790614 A1 | 5/2007 |
| GB | 498223 | 1/1939 |
| WO | WO 01/87464 A1 | 11/2001 |
| WO | WO0187464 A1 | 11/2001 |

OTHER PUBLICATIONS

Keilin, B., et al., "Development of the Catalytic Chamber Process for the Manufacture of Sulfuric and Nitric Acids from Waste Flue Gases," Tyco Labs Incorporated, prepared for the US EPA contract number: PH86-68-75, Oct. 1967 to Sep. 1969.
Gruber A., et al, "Development of the Catalytic Chamber Process," Tyco Labs Incorporated, prepared for the US EPA contract No. CPA 70-59, Apr. 1970 to Oct. 1970.
Booth, "Industrial Gases", 1973, pp. 104-106, Pergamon Press.

* cited by examiner

*Primary Examiner* — Timothy C Vanoy
(74) *Attorney, Agent, or Firm* — Donald T. Black

(57) ABSTRACT

Carbon dioxide is purified by processes employing NOx-rich sulfuric acid that can be formed by removal of $SO_2$ from the carbon dioxide.

36 Claims, 2 Drawing Sheets

PURIFYING CARBON DIOXIDE AND PRODUCING ACID

CROSS-REFERENCE TO RELATED APPLICATION

The present invention claims priority to U.S. provisional patent application Ser. No. 61/100,399, filed Sep. 26, 2008 and Ser. No. 61/100,411, filed Sep. 26, 2008, the entire contents of which are incorporated herein by reference in its entirety.

FIELD OF THE INVENTION

The present invention relates to the treatment of gaseous streams such as flue gas containing carbon dioxide, to remove impurities from the gas and to produce valuable byproducts.

BACKGROUND OF THE INVENTION

It is often desirable to treat carbon dioxide streams, whether naturally occurring or produced by man-made processes, to remove other components and thereby purify the carbon dioxide. For instance, combustion processes, such as coal-fired boilers, produce flue gases that contain carbon dioxide which it may be desirable to capture and sequester, for instance in saline aquifers or in oil or gas wells where the carbon dioxide is used for enhancing the production of oil or gas from the well. However, flue gas often contains impurities such as $SO_2$ and NOx which must be removed down to very low levels before the carbon dioxide can be used for enhanced oil recovery or sequestered. The present invention is a process for achieving such removal, in a way that also produces sulfuric acid and nitric acid of strengths, and in amounts, that are commercially valuable.

BRIEF SUMMARY OF THE INVENTION

One aspect of the present invention is a process for treating gaseous carbon dioxide, comprising
- (A) providing a gaseous feed stream of carbon dioxide that also comprises NOx and sulfur dioxide, and that is at a pressure of at least 2 bar;
- (B) contacting NOx-rich sulfuric acid with said gaseous feed stream and with $NO_2$ desorbed in step (C) to strip NOx from said NOx-rich sulfuric acid and form NOx-reduced sulfuric acid and NOx-augmented gaseous carbon dioxide that comprises $SO_2$ and $NO_2$;
- (C) converting NO in said NOx-reduced sulfuric acid to $NO_2$, and desorbing said $NO_2$ from said NOx-reduced sulfuric acid to form NOx-lean sulfuric acid and desorbed $NO_2$; and
- (D) controlling the amount of desorbed $NO_2$ contacted with NOx-rich sulfuric acid in step (B) by converting desorbed $NO_2$ to nitric acid and NO, and recovering said nitric acid.

A second aspect of the present invention is a process for treating gaseous carbon dioxide, comprising
- (A) providing a gaseous feed stream of carbon dioxide that also comprises NOx and sulfur dioxide, and that is at a pressure of at least 2 bar;
- (B) contacting NOx-rich sulfuric acid (preferably formed in step (E)) with said gaseous feed stream and $NO_2$ desorbed in step (C) to strip NOx from said NOx-rich sulfuric acid and form NOx-reduced sulfuric acid and NOx-augmented gaseous carbon dioxide that comprises $SO_2$ and $NO_2$;
- (C) converting NO in said NOx-reduced sulfuric acid to $NO_2$, and desorbing said $NO_2$ from said NOx-reduced sulfuric acid to form NOx-lean sulfuric acid and desorbed $NO_2$;
- (D) controlling the amount of desorbed $NO_2$ contacted with NOx-rich sulfuric acid in step (B) by converting desorbed $NO_2$ to nitric acid and NO, and recovering said nitric acid; and
- (E) reacting water and oxygen with said NOx-augmented gaseous carbon dioxide to form NOx-rich sulfuric acid and $SO_2$-depleted NOx-containing gaseous carbon dioxide.

Another aspect of the present invention is a process for treating gaseous carbon dioxide, comprising
- (A) providing a gaseous feed stream of carbon dioxide that also comprises NOx and sulfur dioxide, and that is at a pressure of at least 2 bar;
- (B) contacting NOx-rich sulfuric acid (preferably formed in either or both of steps (C) and (D)) with said gaseous feed stream to strip NOx from said NOx-rich sulfuric acid and form NOx-reduced sulfuric acid and NOx-augmented gaseous carbon dioxide that comprises $SO_2$ and $NO_2$;
- (C) reacting water and oxygen with the NOx-augmented gaseous carbon dioxide to form NOx-rich sulfuric acid and $SO_2$-depleted NOx-containing gaseous carbon dioxide; and
- (D) absorbing NOx from said $SO_2$-depleted NOx-containing gaseous carbon dioxide into one or both of NOx-reduced sulfuric acid and NOx-lean sulfuric acid (preferably formed in steps (B) or (C) respectively) to form NOx-rich sulfuric acid and NOx-lean $SO_2$-depleted gaseous carbon dioxide.

Yet another aspect of the present invention is a process for treating gaseous carbon dioxide, comprising
- (A) providing a gaseous feed stream of carbon dioxide that also comprises NOx and sulfur dioxide, and that is at a pressure of at least 2 bar;
- (B) contacting NOx-rich sulfuric acid (preferably formed in one or more of steps (E) and (F)) with said gaseous feed stream and $NO_2$ desorbed in step (C) to strip NOx from said NOx-rich sulfuric acid and form NOx-reduced sulfuric acid and NOx-augmented gaseous carbon dioxide that comprises $SO_2$ and $NO_2$;
- (C) converting NO in said NOx-reduced sulfuric acid to $NO_2$, and desorbing said $NO_2$ from said NOx-reduced sulfuric acid to form NOx-lean sulfuric acid and desorbed $NO_2$;
- (D) controlling the amount of desorbed $NO_2$ contacted with NOx-rich sulfuric acid in step (C) by converting desorbed $NO_2$ to nitric acid and NO, and recovering said nitric acid;
- (E) reacting water and oxygen with the NOx-augmented gaseous carbon dioxide to form NOx-rich sulfuric acid and $SO_2$-depleted NOx-containing carbon dioxide; and
- (F) absorbing NOx from said $SO_2$-depleted Nox-containing carbon dioxide into one or both of Nox-reduced sulfuric acid and Nox-lean sulfuric acid (preferably formed in step (B) or step(C) respectively) to form Nox-rich sulfuric acid and Nox-lean $SO_2$-depleted carbon dioxide.

A further aspect of the present invention is a process for treating gaseous carbon dioxide, comprising
- (A) providing a gaseous feed stream of carbon dioxide that also comprises NOx and sulfur dioxide, and that is at a pressure of at least 2 bar;

(B) converting NO in NOx-rich sulfuric acid (preferably formed in one or both of steps (D) and (E)) to $NO_2$, and desorbing $NO_2$ from said NOx-rich sulfuric acid to form NOx-lean sulfuric acid and desorbed $NO_2$;

(C) controlling the amount of desorbed $NO_2$ contacted with NOx-rich sulfuric acid in step (B) by converting desorbed $NO_2$ to nitric acid and NO, and recovering said nitric acid;

(D) reacting water and oxygen with carbon dioxide in said feed stream and desorbed $NO_2$ to form NOx-rich sulfuric acid and $SO_2$-depleted NOx-containing carbon dioxide; and (E) absorbing NOx from said $SO_2$-depleted NOx-containing carbon dioxide into NOx-lean sulfuric acid (preferably formed in step (B)) to form NOx-rich sulfuric acid and NOx-lean $SO_2$-depleted carbon dioxide.

Other aspects of the invention comprise apparatus useful for treating gaseous carbon dioxide, such as:

(I) Apparatus comprising
(A) a stripping unit in which NOx-rich sulfuric acid can be contacted with a gaseous feed stream of carbon dioxide that also comprises NOx and sulfur dioxide, and that is at a pressure of at least 2 bar and with $NO_2$ desorbed in the converting unit (B) to strip NOx from said NOx-rich sulfuric acid and form NOx-reduced sulfuric acid and NOx-augmented gaseous carbon dioxide that comprises $SO_2$ and $NO_2$;
(B) a converting unit which is coupled to said stripping unit to receive NOx-reduced sulfuric acid therefrom which can catalytically convert NO in said NOx-reduced sulfuric acid to $NO_2$ and desorb said $NO_2$ from said NOx-reduced sulfuric acid to form NOx-lean sulfuric acid and desorbed $NO_2$, and which is coupled to said stripping unit to feed desorbed $NO_2$ to said stripping unit; and
(C) a nitric acid formation unit coupled to said converting unit to receive desorbed $NO_2$ therefrom and to convert said received desorbed $NO_2$ to nitric acid and NO.

(II) Apparatus comprising
(A) a stripping unit in which NOx-rich sulfuric acid can be contacted with a gaseous feed stream of carbon dioxide that also comprises NOx and sulfur dioxide, and that is at a pressure of at least 2 bar and with $NO_2$ desorbed in the converting unit (B) to strip NOx from said NOx-rich sulfuric acid and form NOx-reduced sulfuric acid and NOx-augmented gaseous carbon dioxide that comprises $SO_2$ and $NO_2$;
(B) a converting unit which is coupled to said stripping unit to receive NOx-reduced sulfuric acid therefrom which can catalytically convert NO in said NOx-reduced sulfuric acid to $NO_2$ and desorb said $NO_2$ from said NOx-reduced sulfuric acid to form NOx-lean sulfuric acid and desorbed $NO_2$, and which is coupled to said stripping unit to feed desorbed $NO_2$ to said stripping unit;
(C) a nitric acid formation unit coupled to said converting unit to receive desorbed $NO_2$ therefrom and to convert said received desorbed $NO_2$ to nitric acid and NO; and
(D) a reactor coupled to said stripping unit to receive said NOx-augmented gaseous carbon dioxide therefrom and react it with water and oxygen to form NOx-rich sulfuric acid and $SO_2$-depleted NOx-containing gaseous carbon dioxide.

(III) Apparatus comprising
(A) a stripping unit in which NOx-rich sulfuric acid can be contacted with a gaseous feed stream of carbon dioxide that also comprises NOx and sulfur dioxide, and that is at a pressure of at least 2 bar and with $NO_2$ to strip NOx from said NOx-rich sulfuric acid and form NOx-reduced sulfuric acid and NOx-augmented gaseous carbon dioxide that comprises $SO_2$ and $NO_2$;
(B) a converting unit which is coupled to said stripping unit to receive NOx-reduced sulfuric acid therefrom which can catalytically convert NO in said NOx-reduced sulfuric acid to $NO_2$ and desorb said $NO_2$ from said NOx-reduced sulfuric acid to form NOx-lean sulfuric acid and desorbed $NO_2$;
(C) a nitric acid formation unit coupled to said converting unit to receive desorbed $NO_2$ therefrom and to convert said received desorbed $NO_2$ to nitric acid and NO;
(D) a reactor coupled to said stripping unit to receive said NOx-augmented gaseous carbon dioxide therefrom and react it with water and oxygen to form NOx-rich sulfuric acid and $SO_2$-depleted NOx-containing gaseous carbon dioxide; and
(E) an absorber coupled to said reactor to receive $SO_2$-depleted NOx-containing gaseous carbon dioxide therefrom and absorb NOx from said $SO_2$-depleted NOx-containing carbon dioxide into one or both of said NOx-reduced sulfuric acid and said NOx-lean sulfuric acid to form NOx-rich sulfuric acid and NOx-lean $SO_2$-depleted gaseous carbon dioxide.

(IV) Apparatus comprising
(A) a stripping unit in which NOx-rich sulfuric acid can be contacted with a gaseous feed stream of carbon dioxide that also comprises NOx and sulfur dioxide, and that is at a pressure of at least 2 bar and with $NO_2$ desorbed in the converting unit (B) to strip NOx from said NOx-rich sulfuric acid and form NOx-reduced sulfuric acid and NOx-augmented gaseous carbon dioxide that comprises $SO_2$ and $NO_2$;
(B) a converting unit which is coupled to said stripping unit to receive NOx-reduced sulfuric acid therefrom which can catalytically convert NO in said NOx-reduced sulfuric acid to $NO_2$ and desorb said $NO_2$ from said NOx-reduced sulfuric acid to form NOx-lean sulfuric acid and desorbed $NO_2$, and which is coupled to said stripping unit to feed desorbed $NO_2$ to said stripping unit;
(C) a nitric acid formation unit coupled to said converting unit to receive desorbed $NO_2$ therefrom and to convert said received desorbed $NO_2$ to nitric acid and NO;
(D) a reactor coupled to said stripping unit to receive said NOx-augmented gaseous carbon dioxide therefrom and react it with water and oxygen to form NOx-rich sulfuric acid and $SO_2$-depleted NOx-containing gaseous carbon dioxide; and
(E) an absorber coupled to said reactor to receive $SO_2$-depleted NOx-containing gaseous carbon dioxide therefrom and absorb NOx from said $SO_2$-depleted NOx-containing carbon dioxide into one or both of said NOx-reduced sulfuric acid and said NOx-lean sulfuric acid to form NOx-rich sulfuric acid and NOx-lean $SO_2$-depleted gaseous carbon dioxide.

(V) Apparatus comprising
(A) a converting unit to receive NOx-rich sulfuric acid which can catalytically convert NO in said NOx-rich sulfuric acid to $NO_2$ and desorb $NO_2$ from said NOx-rich sulfuric acid to form NOx-lean sulfuric acid and desorbed $NO_2$;
(B) a nitric acid formation unit coupled to said converting unit to receive desorbed $NO_2$ therefrom and to convert said received desorbed $NO_2$ to nitric acid and NO;
(C) a reactor to receive $NO_2$ desorbed in unit (A) and gaseous carbon dioxide that contains NOx and sulfur dioxide, and to react NOx and sulfur dioxide in said carbon dioxide with water and oxygen and said desorbed $NO_2$ to form NOx-rich sulfuric acid and $SO_2$-depleted NOx-containing gaseous carbon dioxide; and (D) an absorber coupled to said reactor to receive $SO_2$-depleted NOx-containing gaseous carbon dioxide therefrom and absorb NOx from said $SO_2$-depleted NOx-containing carbon dioxide into said NOx-lean sulfuric acid to form NOx-rich sulfuric acid and NOx-lean $SO_2$-depleted gaseous carbon dioxide.

Other aspects of the present invention include the embodiments described hereinbelow.

As used herein, "NOx" means a mixture of gaseous oxides of nitrogen that contains at least both NO and $NO_2$.

As used herein, "oxy-fuel combustion" means feeding fuel and feeding an oxidant stream having an oxygen content of at least 80 vol. % to a combustion process and combusting the fuel with oxygen, possibly with recycle to the combustion process of at least a portion of the gaseous products of the combustion. An oxyfuel combustion process generates a flue gas stream rich in carbon dioxide.

As used herein, "pressure swing adsorption" means adsorbing a product, in this case carbon dioxide, from a gaseous feed stream onto a solid adsorbent at a first pressure, removing the feed stream depleted of the adsorbed product, and then desorbing the product at a second pressure different from the first pressure.

As used herein, "vacuum pressure swing adsorption (VPSA)" means a pressure swing adsorption process in which the second pressure is subambient pressure.

As used herein, "physical absorption" means absorbing a product, in this case carbon dioxide, from a gaseous feed stream by passing the feed stream into a liquid which preferentially dissolves the carbon dioxide from the feed stream, removing the feed stream depleted of the absorbed product, and then recovering the carbon dioxide from the liquid such as by lowering the pressure over the liquid or by stripping the carbon dioxide out of the liquid, wherein the absorption of the carbon dioxide into the liquid does not involve a chemical reaction of the carbon dioxide.

As used herein, "chemical absorption" means absorbing a product, in this case carbon dioxide, from a gaseous feed stream by passing the feed stream into a liquid which contains a component with which the carbon dioxide preferentially reacts, removing the feed stream depleted of the absorbed product, and then recovering the carbon dioxide from the liquid such as by lowering the pressure over the liquid or by stripping the carbon dioxide out of the liquid, wherein the absorption of the carbon dioxide into the liquid involves a chemical reaction of the carbon dioxide with a component in the liquid.

DETAILED DESCRIPTION OF THE INVENTION

The invention is useful in treatment of gaseous carbon dioxide streams which may be obtained in many ways. In particular, gaseous carbon dioxide streams with which the invention is useful include those produced by combustion, especially flue gas streams produced by combustion of hydrocarbonaceous fuels such as coal. The various aspects of the present invention are described below with particular reference to such flue gas streams, but without intending to be limited to such streams.

Figure 1:
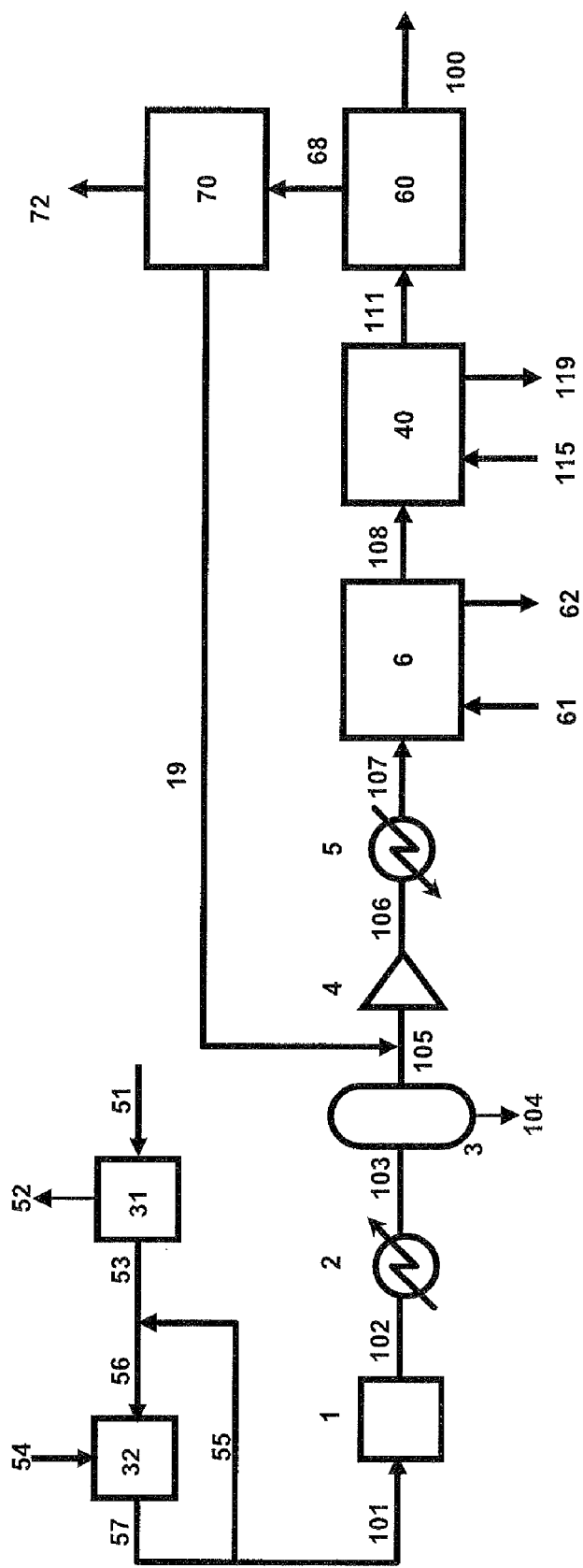
FIG. 1 is a block diagram of a process for treating flue gas, in which the present invention is useful.

FIG. 1 shows a schematic diagram of an overall flue gas treatment process which includes the aspects of the present invention. Carbon dioxide-rich flue gas is obtained from a combustion operation such as a coal-fired boiler, and preferably from an oxy-fuel combustion operation wherein coal or other fuel is combusted with gaseous oxidant having an oxygen content higher than that of air, i.e. higher that 20.9 vol. % preferably higher than 50 vol. % and more preferably higher than 90 vol. % oxygen.

The flue gas is preferably treated, such as in an electrostatic precipitator (ESP in FIG. 1) or in a cyclone or baghouse or other particulate removal device, to remove entrained particulate matter therefrom. Then the flue gas is cooled and any condensed water is removed.

The flue gas is then compressed to a pressure of at least 2 bar, preferably at least 20 bar, and typically 20 to 40 bar. Contaminants (SOx, NOx, and Hg) and moisture are removed and a cleaned-up stream containing carbon dioxide and atmospheric gases ($O_2$, $N_2$ and Ar) is formed which is fed to a subambient-temperature processing stage which upgrades the purity of the carbon dioxide and produces a product stream having a desired high carbon dioxide level (95 to 99.9%). The vent stream from the subambient-temperature processing stage is fed to an adsorption or absorption stage such as a VPSA (vacuum pressure swing adsorption) unit to recover additional carbon dioxide. The recovered carbon dioxide from this stage, typically in a concentration on the order of 80 vol. %, is recycled and mixed with the feed stream of carbon dioxide-rich flue gas. The adsorption or absorption stage also produces a waste stream which is treated further or vented to the atmosphere.

FIG. 1 illustrates one of many possible applications of the present invention. In FIG. 1, air stream 51 is separated in an air separation unit 31 into an oxygen-rich stream 53 and a nitrogen-rich stream 52. The oxygen-rich stream 53 is fed to combustion unit 32 (e.g. furnace or boiler), preferably after being combined with recycled flue gas stream 55, along with fuel which is shown as stream 54. Combustion in unit 32 produces carbon dioxide-containing flue gas 57 part of which may be recycled (as is preferably the case with combustion using oxidant having a high oxygen content) and part of which as stream 101 is fed to a particulate matter control device 1. The particulate matter control device 1 can also be located before the recycle stream 55 if necessary. The flue gas stream 102 following particulate removal is fed to cooling and water removal devices 2 and 3, respectively. Stream 103 represents cooled flue gas proceeding from device 2 to device 3, though the cooling and water removal can instead be carried out in one device. Condensed water 104 is removed from the flue gas.

The flue gas stream 105 from the cooling and water removal is fed to compressor, 4, which could have multiple stages of compression, intercoolers and water knock-out drums. Preferably the flue gas 105 is compressed up to about 25 bar in a staged compression train, although the process of this invention can operate at any pressure from about 2 bar to a pressure needed for carbon dioxide sequestration. Compressed stream 106 is heated in heat exchanger 5 to preferably at least about 160° C. If desired, the flue gas can be heated before it is compressed.

Typical characteristics of the hot, compressed flue gas stream 107 are shown in the following table:

| Characteristic | | Preferred range |
|---|---|---|
| Temperature, C. | Up to 200 | 130-170 |
| Pressure, bar | 3-55 | 20-30 |
| $CO_2$ (vol. %) | 50-98 | 70-90 |
| Hg vapor, ppb | 0.01-1000 | 10-50 |
| NOx, ppm | 20-4000 | 300-1000 |
| $SO_2$ (vol. %) | 0.1-3.0 | 1.0-1.5 |

The carbon dioxide-containing feed gas may preferably be treated at some point to remove mercury. For instance, referring again to FIG. 1, the compressed flue gas 107 is contacted in mercury removal stage 6 with sulfuric acid which is fed as stream 61. Stream 61 preferably comprises concentrated sulfuric acid which is produced in the process of the present invention (recovered as stream 115 or elsewhere in the process). The concentrated sulfuric acid oxidizes mercury vapor that is in the flue gas, and reacts with the mercury vapor, forming HgSO4 as a precipitate 62 which can be easily separated and removed from the flue gas stream producing feed stream 108 which in this case is mercury-depleted. Typically, mercury removal in stage 6 employs a vessel to which a small amount of concentrated (e.g. 93 wt. %) sulfuric acid is continually or intermittently fed to maintain an amount of sulfuric acid circulating within the vessel for contact with the flue gas. The temperatures of the flue gas streams entering and leaving stage 6 are preferably maintained approximately the same so that the moisture content of the flue gas remains approximately the same.

Feed stream 108 is fed to stage 40 where NOx and $SO_2$ are removed from the flue gas, and sulfuric acid 115 and nitric acid 119 are formed, as described below. Stage 40 also produces NOx-lean $SO_2$-depleted flue gas stream 111 which can be used in another industrial or commercial process, or can be further purified.

For instance, stream 111 can be fed to subambient-temperature processing stage 60 where gases including oxygen, nitrogen and argon, and also including NOx and CO if present, are removed from the flue gas. Stage 60 produces stream 100 containing high-purity carbon dioxide, typically having a carbon dioxide content higher than 95 vol. %. Stage 60 also produces a vent gas stream 68 comprising carbon dioxide as well as other gases removed from the flue gas in stage 60. Stream 68 is fed to stage 70 where carbon dioxide is separated from the other gases by adsorption or chemical or physical absorption. Stage 70 produces waste gas stream 72 which can be further treated or vented to atmosphere, and carbon dioxide-containing product stream 19 which is recycled and combined with stream 105 (or, alternatively, with stream 106 or stream 107).

Figure 2:
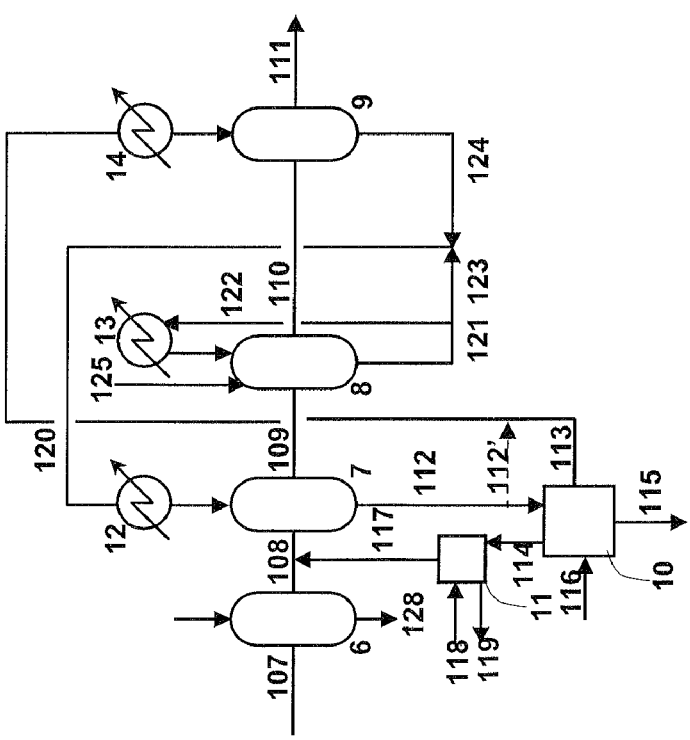
FIG. 2 is a block diagram of a preferred embodiment of a process according to the present invention.

Reference is now made to FIG. 2, which illustrates embodiments of process stage 40.

Gaseous NOx-containing stream 117 and carbon dioxide-containing feed stream 108 are fed to NOx stripping unit 7. Streams 108 and 117 can be combined before being fed together to unit 7, or they can be fed to unit 7 in separate lines. Alternatively stream 117 can be combined with stream 109 before stream 109 enters reactor 8 or stream 117 can be fed independently into reactor 108. The main purpose of the NOx recycle afforded by stream 117 is to elevate the concentration of NOx in the reactor 8 such that the residence time of the flue gas in reactor 8 can be minimized. The idea behind administering stream 117 to the stripping unit 7 is to possibly increase the effective time that the flue gas is in an elevated NOx environment. In unit 7 the incoming feed gas stream at a temperature on the order of 150° C. contacts NOx-rich sulfuric acid, fed as stream 120, to strip dissolved NOx from the acid. The stripped NOx joins the flue gas within unit 7 to form NOx-augmented gas stream 109 which exits unit 7. Stream 112 of NOx-reduced sulfuric acid also exits unit 7. The streams fed to unit 7 are contacted in any manner which provides effective gas-liquid contact, including the use of contact elements such as column packing elements or contact trays, or simply feeding the gas directly into the liquid within the unit.

Stream 120 contains sulfuric acid at a concentration of at least 50 wt. % and preferably at least 70 wt. %. Contacting the feed gas stream with sulfuric acid, rather than water, is preferable as enables the production of concentrated product sulfuric acid, and provides enhanced ability to purify the carbon dioxide.

The NOx-reduced sulfuric acid in stream 112 typically has a concentration of about 93 wt % sulfuric acid. More highly concentrated sulfuric acid (i.e. 98 wt. % or higher) may also be produced. The small amount of NOx which remains absorbed in this acid is removed in unit 10 by feeding stream 112 to unit 10 where NO in the NOx-reduced sulfuric acid is converted by a catalytically promoted reaction with oxygen (fed as stream 116) into $NO_2$, and the $NO_2$ is desorbed from the sulfuric acid. Effective catalytic material includes activated carbon. Desorption can be effected by reducing the pressure over the acid, and/or by heating the acid. This reaction can be carried out to the extent that the total NOx remaining in the sulfuric acid is very low, even less than 5 ppm of NOx, so the resulting $NO_2$-lean sulfuric acid has a concentration and purity that render it commercially salable. Product stream 115 of NOx-lean sulfuric acid is recovered from unit 10. Stream 113 of NOx-lean sulfuric acid is also recovered from unit 10 for further processing as described herein. However, the NOx-lean sulfuric acid 113 can be the NOx-reduced sulfuric acid 112 without passing through unit 10, as is indicated by dashed line 112' in FIG. 2. In this scenario at least some portion of stream 112 bypasses unit 10 and is fed into stream 113.

As stated above, $NO_2$ is fed to stripping unit 7. This $NO_2$ is preferably obtained from gaseous stream 114 which contains NOx and which is produced by removal of NOx from the sulfuric acid in unit 10. Some NOx is removed from the system, preferably by treatment in nitric acid formation unit 11 to convert a portion of the $NO_2$ that is in stream 114 to nitric acid by the addition of water 118. The nitric acid, recovered as stream 119, is also a valuable product of the present invention. The formation of nitric acid proceeds according to the following equation:

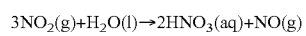

$$3NO_2(g)+H_2O(l)\rightarrow 2HNO_3(aq)+NO(g)$$

The NOx entering unit 11 that is not converted to nitric acid constitutes stream 117 which is treated as described above.

While as depicted in FIG. 2 all of stream 114 can be fed to nitric acid formation unit 11, with only a portion of the $NO_2$ being converted to nitric acid and the remaining $NO_2$ being fed from unit 11 as stream 117, it will be recognized as an alternative that a main stream can lead directly from unit 10 to stripping unit 7, with a side stream branching off of this main stream to feed into unit 10 in which case all of the $NO_2$ that is fed into unit 10 is converted to nitric acid.

The ability to remove nitrogen as nitric acid in stream 119 provides the ability to balance with the amount of nitrogen entering the process in feed gas stream 107. This is particularly useful when stripping unit 7 is part of an overall process for removing NOx from carbon dioxide such as flue gas. The operator can maintain control over this balance by controlling the proportion of NOx fed to unit 11 that is converted to nitric acid (for instance, by controlling how much water is fed to unit 11) or, in the alternative described above in which a main stream is fed from unit 10 to unit 11 and a side stream is fed to unit 11, by controlling how much of the main stream is diverted as the side stream.

The NOx circuit that is enabled by this control maintains a level of NOx high enough to promote formation of sulfuric acid in the next stages, while permitting formation in a reduced amount of time of nitric acid as the outlet for nitrogen entering the system.

The $NO_2$-augmented gas stream 109 that exits unit 7 is fed to reactor 8 for conversion of $SO_2$ that is in stream 109, preferably >99% of that $SO_2$, into sulfuric acid. Water 125 is also fed to reactor 8. In reactor 8, NOx and $SO_2$ autocatalytically react to oxidize $SO_2$ in the feed gas to $SO_3$, which then combines with water to form sulfuric acid. The chemistry is shown in the following Reactions 1, 2 and 3. As shown, $SO_2$ reacts with $NO_2$ forming $SO_3$ which then reacts with water to form sulfuric acid. $NO_2$ is consumed and $NO_2$ is regenerated by oxidation of NO that forms with the $SO_3$. Oxygen for this oxidation can be provided to reactor 8 as air, oxygen-enriched air, or commercially pure oxygen having an O2 content of 90 vol. % or higher. However typically no feed stream of oxidant will need to be added because the O2 level in the gas in stream 109 and in the ambient atmosphere is typically high enough to supply all of the oxidant needed for reaction 3. The cycle represented by Reactions 1, 2 and 3 continues until as much as desired, preferably as much as possible, of the $SO_2$ has been converted to sulfuric acid. Conversion of more than 99% of the $SO_2$, and even of more than 99.9% of the $SO_2$, is obtained in this manner.

$$SO_2 + NO_2 \rightarrow SO_3 + NO \quad \text{Reaction 1}$$

$$SO_3(g) + H_2O(l) \rightarrow H_2SO_4(l) \quad \text{Reaction 2}$$

$$NO + 0.5\,O_2(g) \rightarrow NO_2 \quad \text{Reaction 3}$$

$SO_2$-depleted gas stream 110 is obtained from reactor 8. It still contains $SO_2$, typically much less than 0.1 vol. % $SO_2$. Stream 110 also contains NOx. NOx-rich sulfuric acid stream 121 also exits from reactor 8. A side stream 122 is taken from stream 121, cooled in heat exchanger 13, and returned to reactor 8 as needed in order to maintain temperature control within reactor 8. The remaining NOx-rich sulfuric acid stream 123 can be recycled, with heating as needed in heater 12, to unit 7.

Stream 110, which still contains high levels of NOx, is fed to absorber 9 as is stream 113 of NOx-lean sulfuric acid, after cooling as needed (typically to about 30° C.) in heat exchanger 14. The NOx-lean sulfuric acid used in this step has a sulfuric acid content of at least 50 wt. % and preferably at least 70 wt. %. Using sulfuric acid instead of water affords many advantages, especially in enabling the production of a highly concentrated sulfuric acid product. The NOx-lean sulfuric acid is preferably obtained from unit 10 (or unit 7). The cooled NOx-lean sulfuric acid 113 is contacted with $SO_2$-depleted gas from stream 110 in absorber 9 to absorb NOx from the gas. Contact is preferably provided in any manner which provides effective gas-liquid contact, including the use of contact elements such as column packing elements or contact trays, or simply feeding the gas directly into the liquid within the unit. Product NOx-lean $SO_2$-depleted gas stream 111 leaves absorber 9. Stream 111 contains $SO_2$, in amounts typically of 1-10 ppm or higher. The NOx content of stream 111 is typically about 50 ppm or less. This corresponds to 0.02 lb NOx/MMbtu of power generation in combustion unit 32 which is about one-seventh of the strictest emission requirements now applicable to carbon-dioxide-emitting combustion units.

NOx-rich sulfuric acid stream 124 is also recovered from absorber 9. This stream can be heated as needed and can be recycled to unit 7, for instance by combining streams 124 and 123 as shown in FIG. 2.

The production and usage of concentrated sulfuric acid in the manner of the process of the present invention has many added benefits, one of which is the drying of the carbon dioxide-containing gas prior to any further treatment thereof. This eliminates the need for any subsequent drying before the gas stream proceeds on to the subambient-temperature processing stage for separation of inert gases from the carbon dioxide. The gas leaving absorber 9 has typically been dehydrated to a dew point of less than −70° C. such that this stream can be directly fed to the subambient-temperature processing stage.

The pressure in all stages should be at least 2 bar, and preferably in the range of 20 to 40 bar.

Characteristics of the process streams in this invention are set forth in the following tables:

| Into unit 7: Stream 108 | | Preferred range |
|---|---|---|
| Temperature, C. | Up to 200 | 130-170 |
| Pressure, bar | 3-55 | 20-30 |
| CO$_2$ (vol. %) | 50-98 | 70-90 |
| Hg vapor, (ppb) | .001-100 | 0.001-2 |
| NOx (vol. %) | .0002-4 | 0.5-2 |
| SOx (vol. %) | 0.1-3.0 | 1.0-1.5 |

| Into unit 7: Stream 120 | | Preferred range |
|---|---|---|
| Temperature, C. | 20-150 | 40-80 |
| Pressure, bar | 3-50 | 20-30 |
| CO$_2$ (wt. %) | 0.5-5 | 1-3 |
| NOx (wt. %) | 0.1-20 | 1-5 |
| H2SO4 (wt. %) | 70-100 | 90-98 |

| Out of unit 7/ Into unit 8: Stream 109 | | Preferred range |
|---|---|---|
| Temperature, C. | 50-150 | 60-120 |
| Pressure, bar | 3-50 | 20-30 |
| CO$_2$ (vol. %) | 50-98 | 70-90 |
| NOx (vol. %) | .0002-4 | 0.5-2 |
| SOx (vol. %) | 0.1-3.0 | 1.0-1.5 |

| Out of unit 7/ Into unit 10: Stream 112 | | Preferred range |
|---|---|---|
| Temperature, C. | 80-200 | 140-180 |
| Pressure, bar | 3-50 | 20-30 |
| CO$_2$ (wt. %) | 0.5-10 | 1-5 |
| NOx (wt. %) | 5 ppm-1% | 0.01-0.3 |
| H2SO4 (wt. %) | 70->100 | 93-98 |

| Out of unit 8/ Into unit 9: Stream 110 | | Preferred range |
|---|---|---|
| Temperature, C. | 40-150 | 60-100 |
| Pressure, bar | 3-50 | 20-30 |
| $CO_2$ (vol. %) | 50-98 | 70-90 |
| $NOx$ (vol. %) | 0.1-3.0 | 0.5-2 |
| $SOx$ (vol. %) | 1 ppm-0.5 | 0.01-0.1 |

| Out of unit 8: Stream 121 | | Preferred range |
|---|---|---|
| Temperature, C. | 40-180 | 60-150 |
| Pressure, bar | 3-50 | 20-30 |
| $CO_2$ (wt. %) | 0.5-10 | 1-5 |
| $NOx$ (wt. %) | .0002-4 | 0.1-2 |
| $H2SO4$ (wt. %) | 70->100 | 93-98 |

| Into unit 9: Stream 113 | | Preferred range |
|---|---|---|
| Temperature, C. | 60-200 | 80-180 |
| Pressure, bar | 3-50 | 20-30 |
| $CO_2$ (vol. %) | 0.5-10 | 1-5 |
| $NOx$ (wt. %) | 5 ppm-1% | 0.01-0.3 |
| $H2SO4$ (wt. %) | 70->100 | 93-98 |

| Out of unit 9: Stream 111 | | Preferred range |
|---|---|---|
| Temperature, C. | 20-100 | 30-50 |
| Pressure, bar | 3-50 | 20-30 |
| $CO_2$ (vol. %) | 50-98 | 70-90 |
| $NOx$ (ppm) | 0.1-300 ppm | 1-50 ppm |
| $SOx$ (ppm) | 10-1500 ppm | 10-300 ppm |

| Out of unit 9: Stream 124 | | Preferred range |
|---|---|---|
| Temperature, C. | 20-100 | 40-70 |
| Pressure, bar | 3-50 | 20-30 |
| $CO_2$ (wt. %) | 0.5-15 | 1-5 |
| $NOx$ (wt. %) | .0002-4 | 0.1-3 |
| $H2SO4$ (wt. %) | 70->100 | 80-98 |

| Out of unit 10: Stream 113 | | Preferred range |
|---|---|---|
| Temperature, C. | 60-200 | 80-180 |
| Pressure, bar | 3-50 | 20-30 |
| $CO_2$ (wt. %) | 0.5-10 | 1-5 |
| $NOx$ (wt. %) | 5 ppm-1% | 0.01-0.3 |
| $H2SO4$ (wt. %) | 70->100 | 93-98 |

| Out of unit 10/ Into unit 11: Stream 114 | | Preferred range |
|---|---|---|
| Temperature, C. | 60-200 | 80-180 |
| Pressure, bar | 3-50 | 20-30 |
| $CO_2$ (vol. %) | 0.5-10 | 1-5 |
| $NOx$ (vol. %) | 0.1 ppm-1% | 1 ppm-1000 ppm |
| $SOx$ (vol. %) | 70->100 | 93-98 |

| Out of unit 10: Stream 115 | | Preferred range |
|---|---|---|
| Temperature, C. | 60-200 | 80-180 |
| Pressure, bar | 3-50 | 20-30 |
| $CO_2$ (wt. %) | 0.5-10 | 1-5 |
| $NOx$ (wt. %) | 0.1 ppm-1% | 1 ppm-1000 ppm |
| $H2SO4$ (wt. %) | 70->100 | 93-98 |

| Out of unit 11: Stream 117 | | Preferred range |
|---|---|---|
| Temperature, C. | 60-200 | 80-180 |
| Pressure, bar | 3-50 | 20-30 |
| $CO_2$ (vol. %) | 0.5-90 | 1-60 |
| $NOx$ (vol. %) | 1-100 | 20-60 |
| $SOx$ (vol. %) | 1 ppm-10% | 10-10000 ppm |

| Out of unit 11: Stream 119 | | Preferred range |
|---|---|---|
| Temperature, C. | 60-200 | 80-180 |
| Pressure, bar | 3-50 | 20-30 |
| $CO_2$ (wt. %) | 1 ppm-10% | 0.1-2 |
| $HNO3$ (wt. %) | 20-100 | 40-60 |
| $SOx$ (wt. %) | 1 ppm-10% | 10 ppm-1000 ppm |

The various aspects of the present invention have numerous distinguishing features and provide numerous advantages.

The process preferably operates at higher temperatures than conventional practice, specifically in stripping unit 7 where NOx is stripped out of sulfuric acid. The higher temperature used in stripping unit 7 enables the production of higher sulfuric acid concentrations. Prior practice of units such as unit 7 may only be able to produce sulfuric acid at or below 76 wt %. The factor limiting this concentration is the ability of the process to strip NOx out of the acid solution. As the acid becomes more concentrated, NOx is absorbed more strongly and is thus more difficult to remove by stripping.

The process of the present invention is able to overcome this limitation and produce concentrated acid, because of at least the following two features. Higher temperatures in unit 7 allow NOx to be more easily stripped, and the high temperature catalytic NOx removal reaction in unit 10 helps to remove any residual NOx in the product acid.

The concentrated sulfuric acid, typically exhibiting a concentration higher than 93 wt % acid, which is produced with the process of the present invention has other advantages, such as:

1) Mercury in the flue gas stream can be oxidized using high temperature, >130° C., concentrated acid, >85 wt %, which can be the product sulfuric acid formed and recovered in unit 10. This occurs upstream of the rest of the process to make sure mercury does not contaminate the product acid.

2) The concentrated acid that is fed to absorber 9 (operating at low temperature, on the order of 40° C.) and the high process pressure help to reduce NOx amounts in the gas stream leaving the process to uniquely low levels, i.e. <50 ppm.

3) The concentrated acid that is fed to the absorber 9 effectively reduces the moisture content of the gas stream leaving the process to very low levels. A dew point of less than −70° C. can be expected if 93 wt % or greater sulfuric acid is used in the absorber 9 (for a process operating at ~25 bar). If the flue gas is to be further processed for inert removal as the case may be for carbon dioxide sequestration, this will eliminate the need to use any subsequent drying adsorbents before the flue gas is subjected to cooling in a subambient-temperature processing stage.

Other advantages of the present invention include that $SO_2$, NOx and Hg can be recovered separately. Also, sulfuric acid and nitric acid are produced which are of high enough quality that they may be sold for an additional revenue stream. In addition, the process of the present invention operates at elevated pressure which serves to speed the rate of the homogeneous reactions involved in the process and to reduce the size of the equipment which is needed for the flue gas processing.

The recycling NOx circuit comprised of the NOx in the acid streams and the gas streams shown in FIG. 2, is a preferred feature of this invention. It concentrates the NOx in the system which serves to significantly reduce the necessary residence time of the process. The smaller equipment sizes of the process allowed by the elevated pressure operation and short residence times, allowed by the NOx recycle circuit, serves to reduce the capital cost and footprint of this SOx and NOx removal strategy.

The process of the present invention also permits any subsequent contaminant control devices, such as a selective catalytic reduction unit, mercury adsorbent bed, or water adsorbent bed to be eliminated. This serves to greatly reduce the cost associated with the flue gas processing operation.

Operating costs associated with the process of the present invention will also be reduced over a comparable wet-limestone based desulfurization process because this process will yield separate streams of concentrated saleable sulfuric and nitric acid. If the SOx and NOx is captured as acid and sold, the costs associated with purchase, transportation and disposal of limestone will be eliminated while additional income will be realized.

Additional embodiments of the present invention in addition to those described above may also be practiced. In case the purity of the acid streams produced is not high enough (with respect to residual NOx) for sale on the acid market, additional purification steps may be employed. If further NOx removal from sulfuric acid is necessary, it is evident to one of ordinary skill in the art that there are many processes of NOx removal from sulfuric acid that may also be employed. These processes may include the use of hydrazine, H2O2, sulfamic acid, and the like.

Although the embodiments shown in the Figures show only one unit at each stage of the process, each operating at one given pressure, it is within the scope of this invention to have multiple units at any stage or at each stage operating at a single or multiple pressures. Having multiple absorbers and/or reactors may allow for better control of the $NO:NO_2$ ratio and for more complete NOx and/or SOx containment. Also, the catalytic stripping and/or recycle of NOx may be staged at different locations within a single absorber/reactor or may be staged in multiple absorber and/or reactors.

Figure 3:
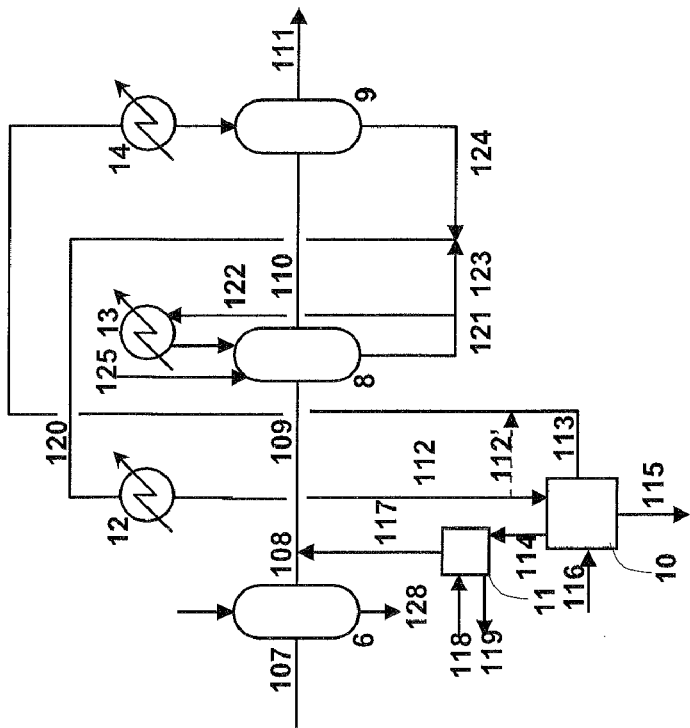
FIG. 3 is a block diagram of an alternate embodiment of the process shown in FIG. 2.

In another embodiment of this invention, shown in FIG. 3, stripping unit 7 is not employed. This embodiment is useful if the amount of NOx in stream 120 is too low to provide significant amounts of stripped NOx into the flue gas stream 108. In such a case, stream 120 (which may be referred to in this embodiment as a NOx-enriched sulfuric acid stream) is sent directly to unit 10, and stream 117 from unit 11 as well as stream 108 are fed to reactor 8 whether or not streams 117 and 108 are joined before entering reactor 8.

In another embodiment of FIG. 3, the operation of stripping unit 7 can be physically integrated with reactor 8 such that the features of both stripping unit 7 and reactor 8 are combined in a single vessel. In such a case, stream 120 is sent directly to unit 10, and stream 117 from unit 11 as well as stream 108 are fed to reactor 8 whether or not streams 117 and 108 are joined before entering reactor 8.

Direct contact intercoolers and aftercoolers may also be used in this system for cooling of the flue gas. Direct contact intercooling is advantageous due to the large volume of gas which would otherwise need to be indirectly cooled. Water or any other solution including sulfuric and/or nitric acid may be used in these direct contact heat exchange stages.

In cases in which oxy-fuel combustion produces flue gas that contains only extremely low amounts of NOx, it may be necessary to add NOx in the form of NO, $NO_2$, nitric acid, or ammonia to the process (for instance, into unit 7) to maintain efficient $SO_2$ removal from the flue gas. Addition of NOx, nitric acid or ammonia may also be necessary during process startups to quickly build up the amount of NOx absorbed in the NOx-rich sulfuric acid to a level which is appropriate for efficient $SO_2$ removal.

As stated above, the NOx-lean $SO_2$-depleted flue gas stream 111 can be used in another industrial or commercial process, combined with other additives, or purified further such as by subambient-temperature processing and/or adsorptive or absorptive processes.

What is claimed is:

1. A process for treating gaseous carbon dioxide, comprising
   (A) providing a gaseous feed stream of carbon dioxide that also comprises NOx and sulfur dioxide, and that is at a pressure of at least 2 bar;
   (B) contacting NOx-rich sulfuric acid with said gaseous feed stream and with $NO_2$ desorbed in step (C) to strip NOx from said NOx-rich sulfuric acid and form NOx-reduced sulfuric acid and NOx-augmented gaseous carbon dioxide that comprises $SO_2$ and $NO_2$;
   (C) converting NO in said NOx-reduced sulfuric acid to $NO_2$, and desorbing said $NO_2$ from said NOx-reduced sulfuric acid to form NOx-lean sulfuric acid and desorbed $NO_2$; and
   (D) controlling the amount of desorbed $NO_2$ contacted with NOx-rich sulfuric acid in step (B) by converting desorbed $NO_2$ to nitric acid and NO, and recovering said nitric acid.

2. A process according to claim 1 wherein said NOx-rich sulfuric acid is formed by absorbing NOx into said NOx-lean sulfuric acid.

3. A process according to claim 1 wherein said NOx-rich sulfuric acid is formed by absorbing NOx into said NOx-reduced sulfuric acid.

4. A process according to claim 1 further comprising recovering product sulfuric acid from said NOx-lean sulfuric acid.

5. A process according to claim 1 wherein said gaseous feed stream of carbon dioxide is formed by combustion.

6. A process for treating gaseous carbon dioxide, comprising
(A) providing a gaseous feed stream of carbon dioxide that also comprises NOx and sulfur dioxide, and that is at a pressure of at least 2 bar;
(B) contacting NOx-rich sulfuric acid with said gaseous feed stream and $NO_2$ desorbed in step (C) to strip NOx from said NOx-rich sulfuric acid and form NOx-reduced sulfuric acid and NOx-augmented gaseous carbon dioxide that comprises $SO_2$ and $NO_2$;
(C) converting NO in said NOx-reduced sulfuric acid to $NO_2$, and desorbing said $NO_2$ from said NOx-reduced sulfuric acid to form NOx-lean sulfuric acid and desorbed $NO_2$;
(D) controlling the amount of desorbed $NO_2$ contacted with NOx-rich sulfuric acid in step (B) by converting desorbed $NO_2$ to nitric acid and NO, and recovering said nitric acid; and
(E) reacting water and oxygen with said NOx-augmented gaseous carbon dioxide to form NOx-rich sulfuric acid and $SO_2$-depleted NOx-containing gaseous carbon dioxide.

7. A process according to claim 6 wherein NOx-rich sulfuric acid formed in step (E) is contacted in step (B) with said gaseous feed stream.

8. A process according to claim 6 wherein said NOx-rich sulfuric acid is formed by absorbing NOx into said NOx-lean sulfuric acid.

9. A process according to claim 6 wherein said NOx-rich sulfuric acid is formed by absorbing NOx into said NOx-reduced sulfuric acid.

10. A process according to claim 6 further comprising recovering product sulfuric acid from said NOx-lean sulfuric acid.

11. A process according to claim 6 wherein said gaseous feed stream of carbon dioxide is formed by combustion.

12. A process for treating gaseous carbon dioxide, comprising
(A) providing a gaseous feed stream of carbon dioxide that also comprises NOx and sulfur dioxide, and that is at a pressure of at least 2 bar;
(B) contacting NOx-rich sulfuric acid with said gaseous feed stream to strip NOx from said NOx-rich sulfuric acid and form NOx-reduced sulfuric acid and NOx-augmented gaseous carbon dioxide that comprises $SO_2$ and $NO_2$;
(C) reacting water and oxygen with the NOx-augmented gaseous carbon dioxide to form NOx-rich sulfuric acid and $SO_2$-depleted NOx-containing gaseous carbon dioxide; and
(D) absorbing NOx from said $SO_2$-depleted NOx-containing gaseous carbon dioxide into one or both of NOx-reduced sulfuric acid and NOx-lean sulfuric acid to form NOx-rich sulfuric acid and NOx-lean $SO_2$-depleted gaseous carbon dioxide.

13. A process according to claim 12 wherein NOx-rich sulfuric acid formed in one or both of steps (C) and (D) is contacted in step (B) with said gaseous feed stream.

14. A process according to claim 12 wherein NOx-rich sulfuric acid formed in both of steps (C) and (D) is contacted in step (B) with said gaseous feed stream.

15. A process according to claim 12 wherein NOx is absorbed in step (D) into NOx-reduced sulfuric acid formed in step (B).

16. A process according to claim 12 wherein NOx is absorbed in step (D) into NOx-lean sulfuric acid formed in step (C).

17. A process according to claim 12 further comprising recovering product sulfuric acid from said NOx-lean sulfuric acid.

18. A process according to claim 12 wherein said gaseous feed stream of carbon dioxide is formed by combustion.

19. A process for treating gaseous carbon dioxide, comprising
(A) providing a gaseous feed stream of carbon dioxide that also comprises NOx and sulfur dioxide, and that is at a pressure of at least 2 bar;
(B) contacting NOx-rich sulfuric acid with said gaseous feed stream and with $NO_2$ desorbed in step (C) to strip NOx from said NOx-rich sulfuric acid and form NOx-reduced sulfuric acid and NOx-augmented gaseous carbon dioxide that comprises $SO_2$ and $NO_2$;
(C) converting NO in said NOx-reduced sulfuric acid to $NO_2$, and desorbing said $NO_2$ from said NOx-reduced sulfuric acid to form NOx-lean sulfuric acid and desorbed $NO_2$;
(D) controlling the amount of desorbed $NO_2$ contacted with NOx-rich sulfuric acid in step (B) by converting desorbed $NO_2$ to nitric acid and NO, and recovering said nitric acid;
(E) reacting water and oxygen with the NOx-augmented gaseous carbon dioxide to form NOx-rich sulfuric acid and $SO_2$-depleted NOx-containing carbon dioxide; and
(F) absorbing NOx from said $SO_2$-depleted NOx-containing carbon dioxide into one or both of said NOx-reduced sulfuric acid and said NOx-lean sulfuric acid to form NOx-rich sulfuric acid and NOx-lean $SO_2$-depleted carbon dioxide.

20. A process according to claim 19 wherein NOx-rich sulfuric acid formed in one or both of steps (E) and (F) is contacted in step (B) with said gaseous feed stream.

21. A process according to claim 19 wherein NOx-rich sulfuric acid formed in both of steps (E) and (F) is contacted in step (B) with said gaseous feed stream.

22. A process according to claim 19 wherein NOx is absorbed in step (D) into NOx-reduced sulfuric acid formed in step (B).

23. A process according to claim 19 wherein NOx is absorbed in step (D) into NOx-lean sulfuric acid formed in step (C).

24. A process according to claim 19 further comprising recovering product sulfuric acid from said NOx-lean sulfuric acid.

25. A process according to claim 19 wherein said gaseous feed stream of carbon dioxide is formed by combustion.

26. A process for treating gaseous carbon dioxide, comprising
(A) providing a gaseous feed stream of carbon dioxide that also comprises NOx and sulfur dioxide, and that is at a pressure of at least 2 bar;
(B) converting NO in NOx-rich sulfuric acid to $NO_2$, and desorbing $NO_2$ from said NOx-rich sulfuric acid to form NOx-lean sulfuric acid and desorbed $NO_2$;
(C) controlling the amount of desorbed $NO_2$ fed to step (D) by converting desorbed $NO_2$ to nitric acid and NO, and recovering said nitric acid;
(D) reacting water and oxygen with NOx and sulfur dioxide in said feed stream and desorbed $NO_2$ to form NOx-rich sulfuric acid and $SO_2$-depleted NOx-containing carbon dioxide; and
(E) absorbing NOx from said $SO_2$-depleted NOx-containing carbon dioxide into said NOx-lean sulfuric acid to form NOx-rich sulfuric acid and NOx-lean $SO_2$-depleted carbon dioxide.

27. A process according to claim 26 wherein NOx-rich sulfuric acid formed in one or both of steps (D) and (E) is contacted in step (B) with said gaseous feed stream.

28. A process according to claim 26 wherein NOx-rich sulfuric acid formed in both of steps (D) and (E) is contacted in step (B) with said gaseous feed stream.

29. A process according to claim 26 wherein NOx is absorbed in step (E) into NOx-lean sulfuric acid formed in step (B).

30. A process according to claim 26 further comprising recovering product sulfuric acid from said NOx-lean sulfuric acid.

31. A process according to claim 26 wherein said gaseous feed stream of carbon dioxide is formed by combustion.

32. Apparatus for treating gaseous carbon dioxide, comprising
   (A) a stripping unit in which NOx-rich sulfuric acid can be contacted with a gaseous feed stream of carbon dioxide that also comprises NOx and sulfur dioxide, and that is at a pressure of at least 2 bar and with $NO_2$ desorbed in the converting unit (B) to strip NOx from said NOx-rich sulfuric acid and form NOx-reduced sulfuric acid and NOx-augmented gaseous carbon dioxide that comprises $SO_2$ and $NO_2$;
   (B) a converting unit which is coupled to said stripping unit to receive NOx-reduced sulfuric acid therefrom which can catalytically convert NO in said NOx-reduced sulfuric acid to $NO_2$ and desorb said $NO_2$ from said NOx-reduced sulfuric acid to form NOx-lean sulfuric acid and desorbed $NO_2$, and which is coupled to said stripping unit to feed desorbed $NO_2$ to said stripping unit; and
   (C) a nitric acid formation unit coupled to said converting unit to receive desorbed $NO_2$ therefrom and to convert said received desorbed $NO_2$ to nitric acid and NO.

33. Apparatus for treating gaseous carbon dioxide, comprising
   (A) a stripping unit in which NOx-rich sulfuric acid can be contacted with a gaseous feed stream of carbon dioxide that also comprises NOx and sulfur dioxide, and that is at a pressure of at least 2 bar and with $NO_2$ desorbed in the converting unit (B) to strip NOx from said NOx-rich sulfuric acid and form NOx-reduced sulfuric acid and NOx-augmented gaseous carbon dioxide that comprises $SO_2$ and $NO_2$;
   (B) a converting unit which is coupled to said stripping unit to receive NOx-reduced sulfuric acid therefrom which can catalytically convert NO in said NOx-reduced sulfuric acid to $NO_2$ and desorb said $NO_2$ from said NOx-reduced sulfuric acid to form NOx-lean sulfuric acid and desorbed $NO_2$, and which is coupled to said stripping unit to feed desorbed $NO_2$ to said stripping unit;
   (C) a nitric acid formation unit coupled to said converting unit to receive desorbed $NO_2$ therefrom and to convert said received desorbed $NO_2$ to nitric acid and NO; and
   (D) a reactor coupled to said stripping unit to receive said NOx-augmented gaseous carbon dioxide therefrom and react it with water and oxygen to form NOx-rich sulfuric acid and $SO_2$-depleted NOx-containing gaseous carbon dioxide.

34. Apparatus for treating gaseous carbon dioxide, comprising
   (A) a stripping unit in which NOx-rich sulfuric acid can be contacted with a gaseous feed stream of carbon dioxide that also comprises NOx and sulfur dioxide, and that is at a pressure of at least 2 bar and with $NO_2$ to strip NOx from said NOx-rich sulfuric acid and form NOx-reduced sulfuric acid and NOx-augmented gaseous carbon dioxide that comprises $SO_2$ and $NO_2$;
   (B) a converting unit which is coupled to said stripping unit to receive NOx-reduced sulfuric acid therefrom which can catalytically convert NO in said NOx-reduced sulfuric acid to $NO_2$ and desorb said $NO_2$ from said NOx-reduced sulfuric acid to form NOx-lean sulfuric acid and desorbed $NO_2$;
   (C) a nitric acid formation unit coupled to said converting unit to receive desorbed $NO_2$ therefrom and to convert said received desorbed $NO_2$ to nitric acid and NO;
   (D) a reactor coupled to said stripping unit to receive said NOx-augmented gaseous carbon dioxide therefrom and react it with water and oxygen to form NOx-rich sulfuric acid and $SO_2$-depleted NOx-containing gaseous carbon dioxide; and
   (E) an absorber coupled to said reactor to receive $SO_2$-depleted NOx-containing gaseous carbon dioxide therefrom and absorb NOx from said $SO_2$-depleted NOx-containing carbon dioxide into one or both of said NOx-reduced sulfuric acid and said NOx-lean sulfuric acid to form NOx-rich sulfuric acid and NOx-lean $SO_2$-depleted gaseous carbon dioxide.

35. Apparatus for treating gaseous carbon dioxide, comprising
   (A) a stripping unit in which NOx-rich sulfuric acid can be contacted with a gaseous feed stream of carbon dioxide that also comprises NOx and sulfur dioxide, and that is at a pressure of at least 2 bar and with $NO_2$ desorbed in the converting unit (B) to strip NOx from said NOx-rich sulfuric acid and form NOx-reduced sulfuric acid and NOx-augmented gaseous carbon dioxide that comprises $SO_2$ and $NO_2$;
   (B) a converting unit which is coupled to said stripping unit to receive NOx-reduced sulfuric acid therefrom which can catalytically convert NO in said NOx-reduced sulfuric acid to $NO_2$ and desorb said $NO_2$ from said NOx-reduced sulfuric acid to form NOx-lean sulfuric acid and desorbed $NO_2$, and which is coupled to said stripping unit to feed desorbed $NO_2$ to said stripping unit;
   (C) a nitric acid formation unit coupled to said converting unit to receive desorbed $NO_2$ therefrom and to convert said received desorbed $NO_2$ to nitric acid and NO;
   (D) a reactor coupled to said stripping unit to receive said NOx-augmented gaseous carbon dioxide therefrom and react it with water and oxygen to form NOx-rich sulfuric acid and $SO_2$-depleted NOx-containing gaseous carbon dioxide; and
   (E) an absorber coupled to said reactor to receive $SO_2$-depleted NOx-containing gaseous carbon dioxide therefrom and absorb NOx from said $SO_2$-depleted NOx-containing carbon dioxide into one or both of said NOx-reduced sulfuric acid and said NOx-lean sulfuric acid to form NOx-rich sulfuric acid and NOx-lean $SO_2$-depleted gaseous carbon dioxide.

36. Apparatus for treating gaseous carbon dioxide, comprising
   (A) a converting unit to receive NOx-rich sulfuric acid which can catalytically convert NO in said NOx-rich sulfuric acid to $NO_2$ and desorb $NO_2$ from said NOx-rich sulfuric acid to form NOx-lean sulfuric acid and desorbed $NO_2$;
   (B) a nitric acid formation unit coupled to said converting unit to receive desorbed $NO_2$ therefrom and to convert said received desorbed $NO_2$ to nitric acid and NO;
   (C) a reactor to receive $NO_2$ desorbed in unit (A) and gaseous carbon dioxide that contains NOx and sulfur dioxide, and to react NOx and sulfur dioxide in said carbon dioxide with water and oxygen and said desorbed $NO_2$ to form NOx-rich sulfuric acid and $SO_2$-depleted NOx-containing gaseous carbon dioxide; and (D) an absorber coupled to said reactor to receive $SO_2$-depleted NOx-containing gaseous carbon dioxide therefrom and absorb NOx from said $SO_2$-depleted NOx-containing carbon dioxide into said NOx-lean sulfuric acid to form NOx-rich sulfuric acid and NOx-lean $SO_2$-depleted gaseous carbon dioxide.

* * * * *